United States Patent
Hays

(10) Patent No.: US 8,018,906 B2
(45) Date of Patent: Sep. 13, 2011

(54) SYMBOL INTERLEAVE FOR WIRELESS COMMUNICATIONS

(75) Inventor: Nathan Hays, San Francisco, CA (US)

(73) Assignee: Terrace Communications Corporation, San Francisco, CA (US)

( * ) Notice: Subject to any disclaimer, the term of this patent is extended or adjusted under 35 U.S.C. 154(b) by 1022 days.

(21) Appl. No.: 11/861,214

(22) Filed: Sep. 25, 2007

(65) Prior Publication Data

US 2009/0080383 A1    Mar. 26, 2009

(51) Int. Cl.
    *H04B 7/216*    (2006.01)
(52) U.S. Cl. ......... 370/335; 370/204; 370/342; 370/441
(58) Field of Classification Search ............... 370/203, 370/204, 208, 209, 310, 319, 320, 326, 335, 370/336, 342, 441
    See application file for complete search history.

(56) References Cited

U.S. PATENT DOCUMENTS

| | | | | |
|---|---|---|---|---|
| 5,359,627 A * | 10/1994 | Resnikoff | | 375/254 |
| 5,619,492 A * | 4/1997 | Press et al. | | 370/441 |
| 6,044,119 A * | 3/2000 | Sato et al. | | 375/344 |
| 6,078,573 A * | 6/2000 | Batalama et al. | | 370/335 |
| 6,175,848 B1 * | 1/2001 | Riley | | 708/300 |
| 6,985,516 B1 * | 1/2006 | Easton et al. | | 375/150 |
| 7,027,492 B2 * | 4/2006 | Bertrand et al. | | 375/148 |
| 7,751,372 B2 * | 7/2010 | Monsen | | 370/335 |
| 2005/0068932 A1 * | 3/2005 | Lakkis | | 370/347 |

* cited by examiner

*Primary Examiner* — Chi H Pham
*Assistant Examiner* — Weibin Huang
(74) *Attorney, Agent, or Firm* — Trellis IP Law Group, PC

(57) ABSTRACT

A receiver includes a plurality of de-spreading correlators that are programmed to only correlate a specific portion of the full spreading code according to an interleave factor. Each correlator may be associated with a different symbol. The received signal may be received at all correlators and is multiplied by a code generated by a code generator according to the symbol associated with the correlator. While each correlator may be despreading the received signal at all times, an enable signal is used to determine when information for an associated cell should be accumulated for each correlator.

23 Claims, 6 Drawing Sheets

SYMBOL INTERLEAVE FOR WIRELESS COMMUNICATIONS

BACKGROUND

Particular embodiments generally relate to communication systems and more specifically to symbol interleave in wireless communications.

In spread spectrum communications, such as direct-sequence spread spectrum (DSSS), a transmitted signal is spread using a modulation technique. The transmitted signal takes up more bandwidth than the information signal that is being modulated. The data signal is modulated using a continuous string of pseudo-noise code (PN code) signals called chips. The data signal is modulated by a sequence of chips (symbol) at a chip rate that may be higher than the data signal bit rate. The receiver that receives the transmitted signal can demodulate the signal by applying the inverse PN sequence to it.

When a transmitter has multiple information packets to be transmitted at the same time with differing data rates, it may form multiple transmission signals and combine them before transmission which increases the dynamic range required in the transmitter, which may be undesirable. Alternatively, the transmitter may offset the information packets in time and send each at its own data rate. To receive this, the receiver must accommodate a range of data rates. If either of these transmission methods is used in an environment with multiple transmitters, the receiver complexity can be prohibitive.

SUMMARY

Particular embodiments interleave symbols in a spread spectrum communication system. A transmitter interleaves symbols for a plurality of data cells to be transmitted and spreads a signal by a portion of a longer spreading sequence. At different times, a transmitter uses a shorter length code for different symbols to spread data for cells for different channels at different times.

A receiver includes a plurality of de-spreading correlators that are programmed to only correlate a specific portion of the full spreading code according to an interleave factor. Each correlator may be associated with a different symbol. The received signal may be received at all correlators and is multiplied by a code generated by a code generator according to the symbol associated with the correlator. While each correlator may be despreading the received signal at all times, an enable signal is used to determine when information for an associated cell should be accumulated for each correlator. For example, if a symbol is 512 chips and two channels are being used, each code may be 256 chips. When two different symbols for two different data cells are interleaved, the first cell's symbols are modulated by chips 0-255 for the first symbol and the second cell's symbols are modulated by chips 256-511 for the second symbol. The accumulation of despread data for a correlator is only performed at certain times depending on the interleave factor. For example, the first correlator accumulates the despread data when the chips 0-255 of its symbol are applied to the signal and the second correlator accumulates the despread data when the chips 256-511 of its symbol are applied to the signal.

A further understanding of the nature and the advantages of the inventions disclosed herein may be realized by reference of the remaining portions of the specification and the attached drawings.

DETAILED DESCRIPTION OF EXAMPLE EMBODIMENTS

Figure 1:
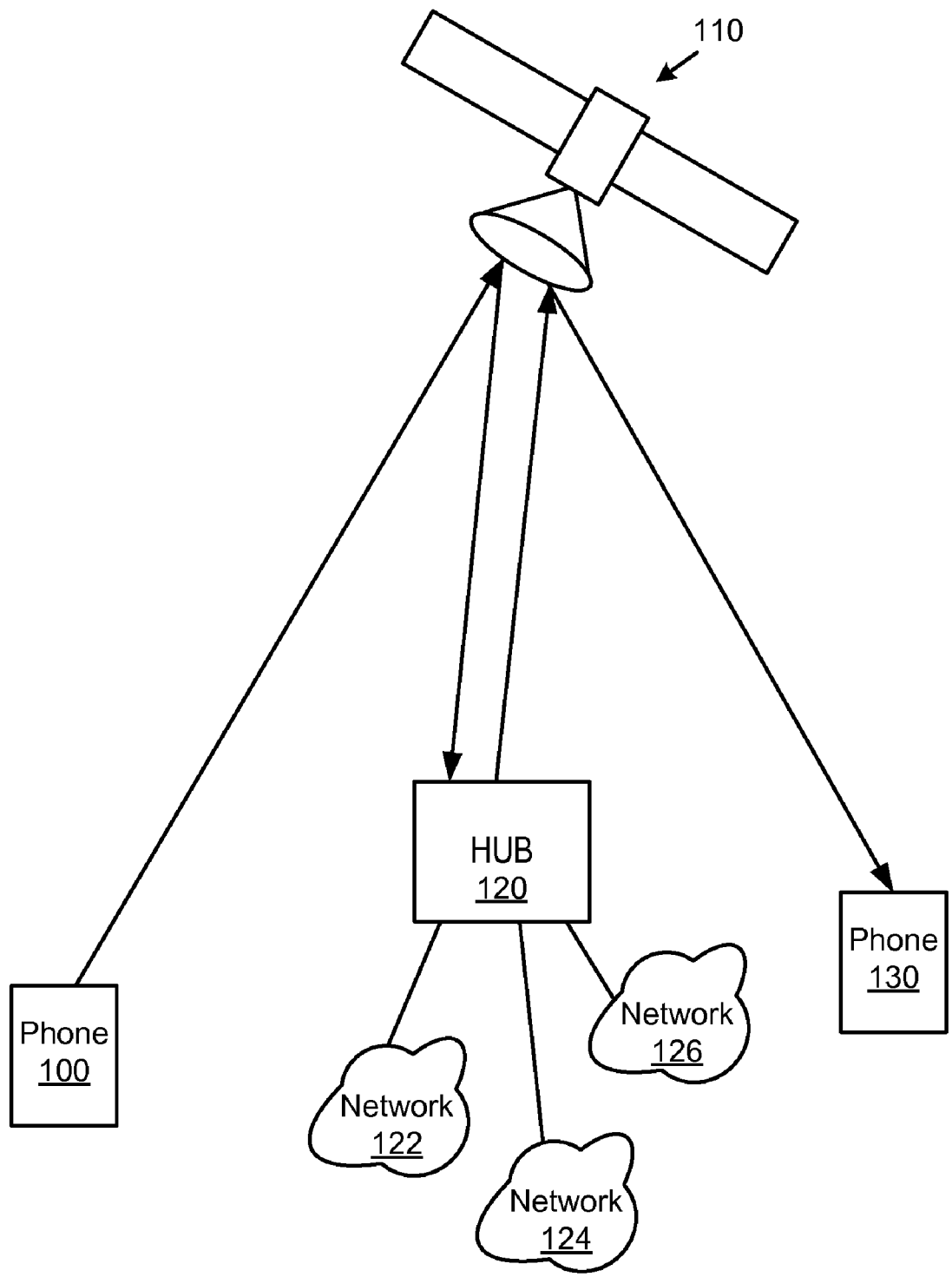
FIG. 1 depicts the basic components in a digital satellite voice communications system according to one embodiment.

FIG. 1 depicts the basic components in a digital satellite voice communications system according to one embodiment. Although a digital satellite voice communications system is described, it will be understood that other communications systems may be used. In FIG. 1, data modem or phone 100 (e.g., a transmitter) may be used to originate a voice transmission intended for phone 130 (e.g., a receiver). For example, the transmission from phone 100 can be transferred through a cell phone network (not shown). Other networks and devices, such as the Internet, a local area network (LAN), switches, routers, etc., can be employed, but are not shown for ease of illustration. In general, the intermediary communication channels and devices are not included in the discussion herein. Any number and type of transmitters and/or receivers may be used, such as a pager, data modem or device that carries digitized voice, personal digital assistant (PDA), portable e-mail device (e.g., Blackberry™, etc.), laptop or other computing device, landline (e.g., plain old telephone service or POTS) telephone, etc. Further, any suitable types of transmission systems, protocols, data formats, etc., can be utilized in particular embodiments.

A transmission from phone 100 can be converted to an RF signal, such as a spread spectrum signal, and sent to satellite 110. Satellite 110, in turn, can send the signal to a hub (e.g., 120) for timing synchronization, signal coordination, routing and/or other processing. Hub 120 shown in FIG. 1 may be coupled to other communication infrastructure and/or resources, such as Internet 122, cellular phone network 124, standard phone network 126, etc. Also, timing features in particular embodiments can be applied to any one leg or hop of a signal transmission. Further, such a transmission need not be round-trip, or need not reach its ultimate intended receiver.

Hub 120 can include processing resources, such as a central processing unit (CPU) coupled to random-access memory (RAM), and/or other typical digital computing resources. In particular embodiments, as much of the functionality as possible, as described herein, is performed by hub 120. However, in some embodiments all or a portion of the functionality may be performed by other devices, such as phones 100 and/or 130, satellite 110, intermediary devices (not shown), or other components or devices, as desired. Further, processing can be performed in real time or near real time. In addition, functions can be performed in a distributed processing manner (e.g., parallel processing by multiple devices), in a batch mode, or by any other suitable means.

A signal sent to hub 120 may be processed and sent back to satellite 110 for transfer to phone 130, which can be the ultimate intended receiver of the signal in this particular example. However, the second leg of the transmission need not be by satellite. In other words, the transmission from hub 120 to satellite 110 and to phone 130 may be by a terrestrial network, such as the Internet, a cellular phone network, a standard telephone network, terrestrial radio network, fiber optic, etc. Timing detection and control functions can be performed at any suitable point in a system, and for any one or more signals in a transmission. For example, a transceiver can receive and measure its previously transmitted signal, or a signal derived therefrom. Further, although features are described herein as primarily directed to a satellite communications system, other types of communications systems can be adaptable for use in particular embodiments.

In one embodiment, phone 100 may be a transmitter and hub 120 and/or phone 130 may be a receiver. Particular embodiments interleave symbols in a spread spectrum communication system. A transmitter interleaves symbols for a plurality of data cells to be transmitted and spreads a signal by a portion of a longer spreading sequence. The symbol period for each cell remains constant and independent of the amount of interleave.

A receiver includes a plurality of de-spreading correlators that are programmed to only correlate a specific portion of the full spreading sequence, which may be a code, according to the interleave factor. The receiver architecture is simplified over conventional variable rate dispreading systems because each correlator in particular embodiments works at a constant symbol rate. That is, a symbol may include a number of chips. A spreading code including a number of the chips may be determined. A transmitted signal is then modulated by the codes for different channels at different times. For example, if a symbol is 512 chips and two channels are being used, each code may be 256 chips. When two different symbols for two different data cells are interleaved, the first cell's symbols are modulated by chips 0-255 for the first symbol and the second cell's symbols are modulated by chips 256-511 for the second symbol. Correlators for the receivers are designed to despread the signal received at a constant symbol rate. The symbol rate may be the rate at which chips are applied to the signal to despread it. However, the accumulation of despread data for a correlator is only performed at certain times depending on the interleave factor. For example, the first correlator accumulates the despread data when the chips 0-255 of its symbol are applied to the signal and the second correlator accumulates the despread data when the chips 256-511 of its symbol are applied to the signal.

Figure 2:
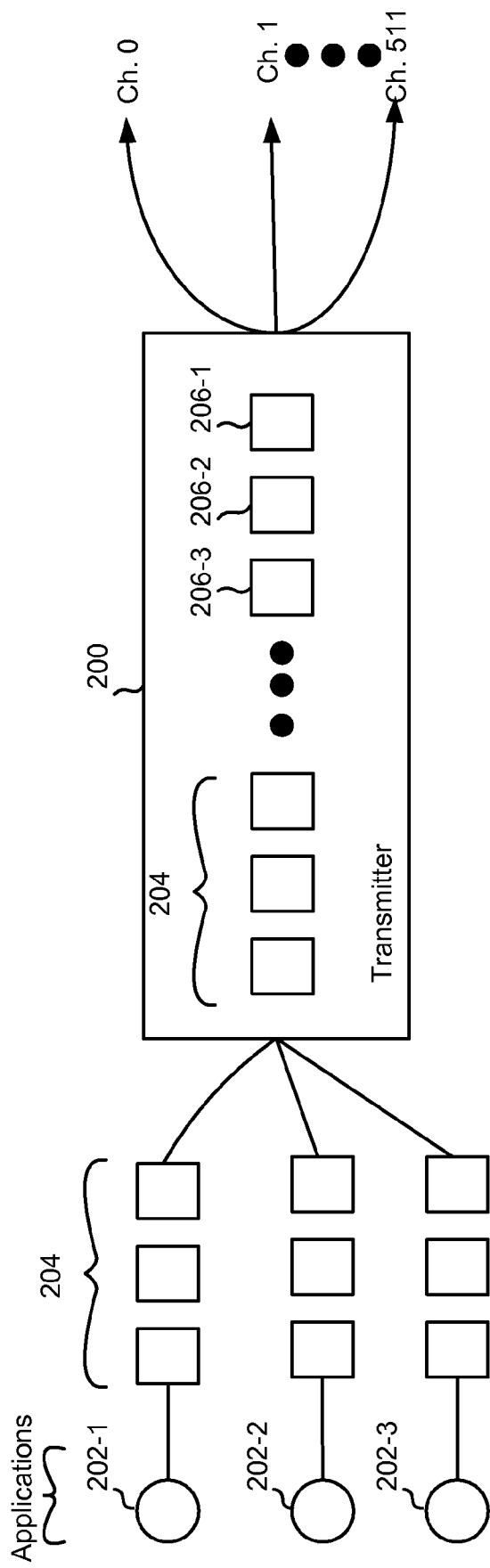
FIG. 2 depicts an example of a transmitter according to one embodiment.

FIG. 2 depicts an example of a transmitter 200 according to one embodiment. As shown, applications 202 may be sending packets 204 of data. Different applications 202 may send different streams of packets 204. These packets may be received at transmitter 200 through a port, such as an ethernet port. Packets 204 may be sent in different streams but are serialized in transmitter 200. Packets 204 may be converted into cells 206. A cell may be a unit of data that is similar to a packet.

Figure 3:
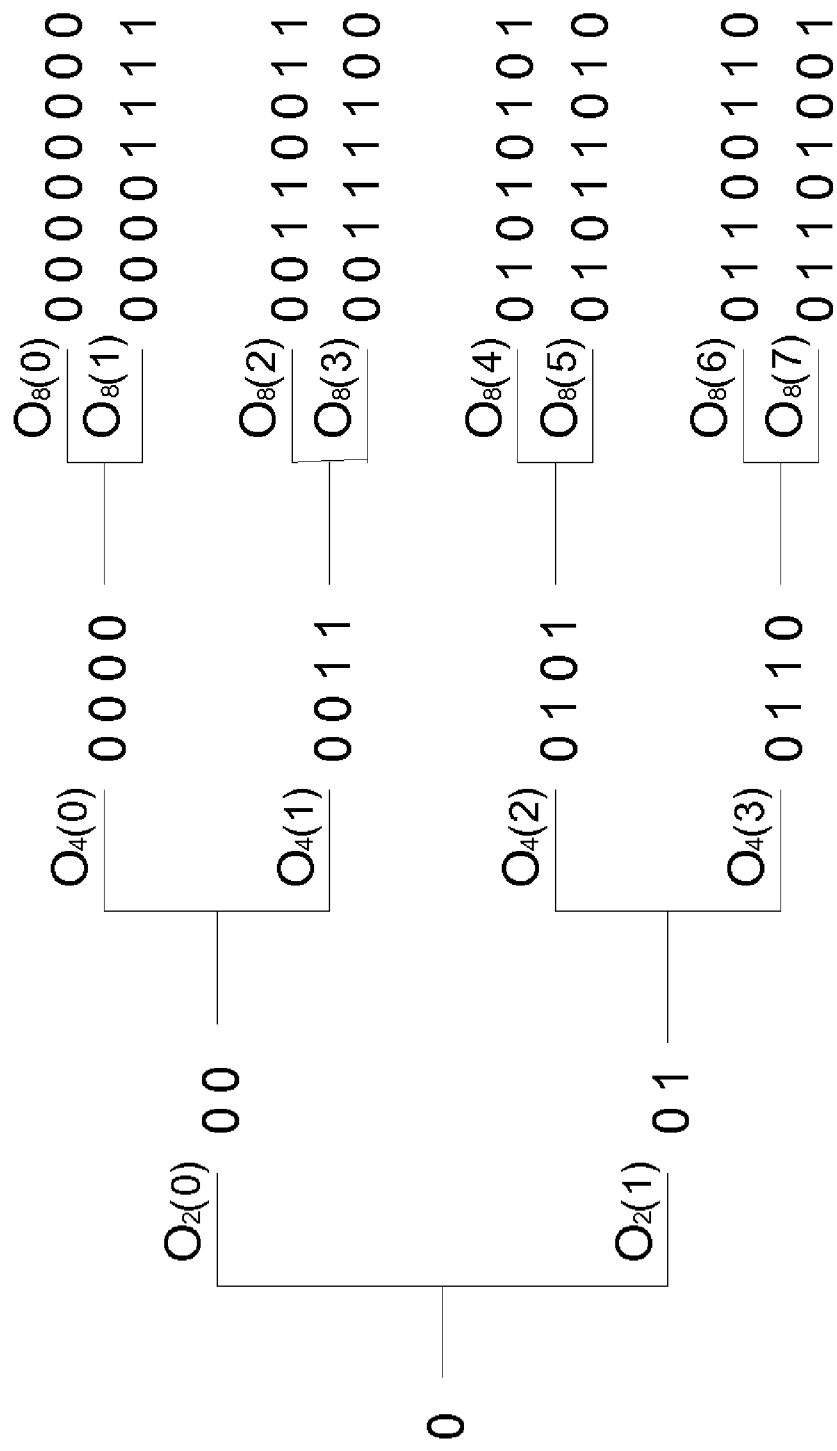
FIG. 3 shows an example of codes that may be used.

Data for each cell is then sent on different channels. Each channel may be spread by a different symbol. For example, FIG. 3 shows an example of codes that may be used. In one embodiment, the codes shown are a 16-chip orthogonal variable spreading factor (OVSF) tree. Although these codes are described, it will be understood that other codes may be used. In one embodiment, the code set is orthogonal even when interleaved with symbols for different data. Orthogonal means that the signals do not interfere with one another when different codes are used to spread a transmitted signal. By sustaining orthogonality, no decrease in the number of simultaneous transmissions is required because of multiple access interference when interleaving. However, it is not required that codes remain orthogonal when interleaved. For systems with relatively few simultaneous transmissions, pseudo-orthogonal performance is sufficient to separate multiple transmissions.

In one embodiment, the code set that is used is a Walsh or Hadamard code set. In these code sets, an interleave factor of the power of 2 is used to maintain orthogonality between codes. For example, the spreading code formed from two symbols occupying the first and second half of a Walsh code is orthogonal to all other codes in the set not on the same branch of the Walsh tree. For example, a code $O_4(0)$ is orthogonal to all codes except for codes $O_2(0)$, $O_8(0)$, and $O_8(1)$. Accordingly, if transmitter 200 uses a higher rate code, all lower rate codes derived from the same branch are not available to other transmitters.

Particular embodiments interleave symbols for multiple cells using a higher rate (shorter) code. The symbols are interleaved by applying shorter length codes at different times to modulate a transmitted signal. For example, if a transmitter is using the $O_4(1)$ code, it is interleaving symbols for two cells. Both cells are spread using the code [0011]. The transmitter may use the symbol $O_8(2)$ of [00110011] for spreading a first cell for a first channel and may use the symbol $O_8(3)$ of [00111100] for spreading a second cell for a second channel. However, a shorter length code [0011] is used to spread the data for different channels at different times. For example, the first cell is spread using the second four chips [0011] of the symbol [00110011]. Also, the second cell is spread using the first four chips [0011] of the symbol [00111100]. Thus, different symbols may be used to spread the cells, but chips for the different symbols are interleaved when spreading data for different channels.

Different constellations may be used on different channels. For example, each of the cells to be interleaved may use a different constellation independent from other cells. In one example, if two cells are to be interleaved, the symbols of the first cell can be modulated using a 4-quadrature amplitude modulation (QAM) and the second cell may use a 256-QAM. QAM is a modulation scheme that conveys data by changing the amplitude of two carrier waves. The carrier waves may be out of phase with each other when the amplitudes are changed.

Figure 4:
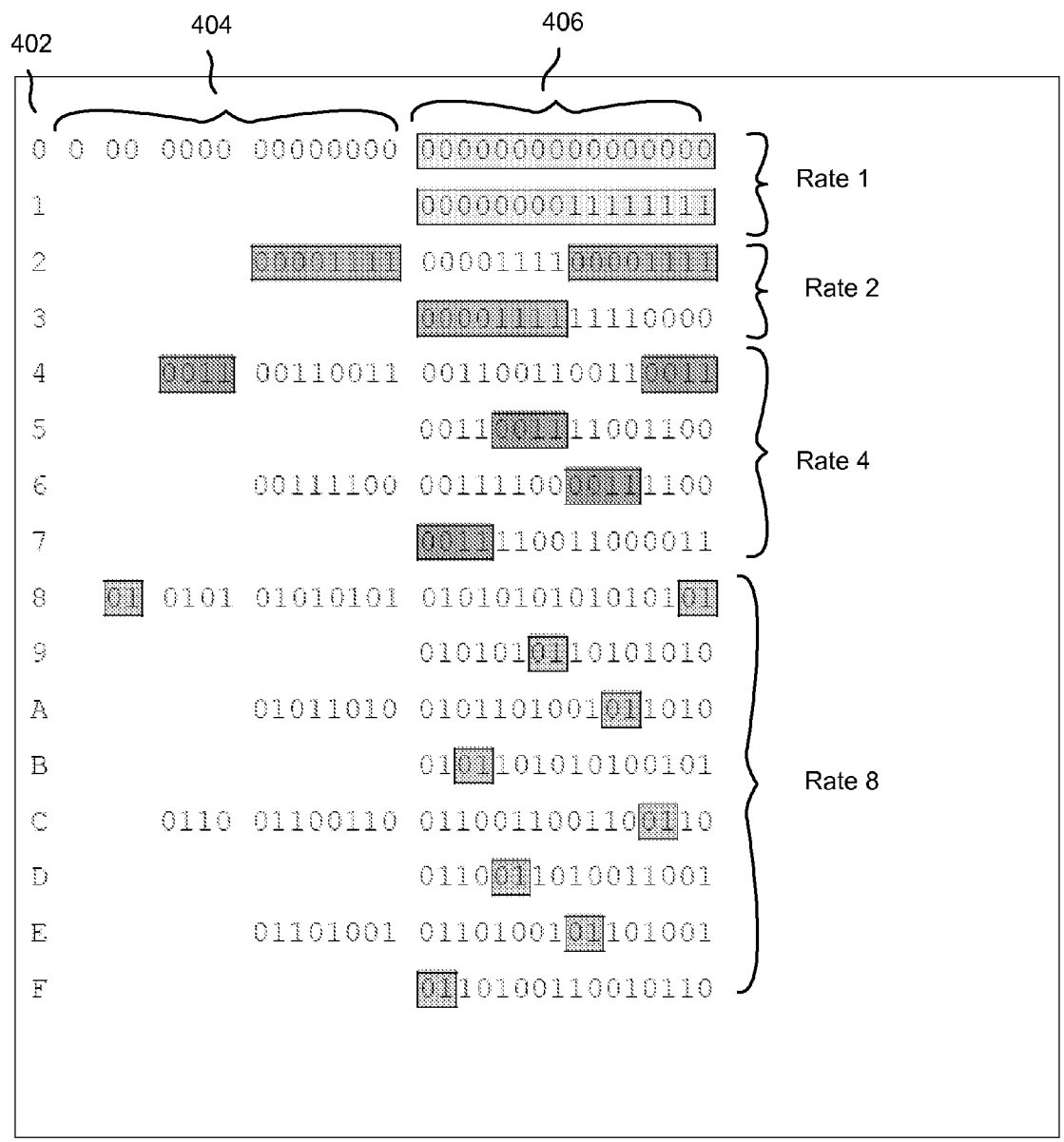
FIG. 4 shows different spreading rates that can be handled by different branches of the tree shown in FIG. 3 according to one embodiment.

FIG. 4 shows different spreading rates that can be handled by different branches of the tree shown in FIG. 3 according to one embodiment. A first column 402 shows an index of a receiver. For example, different receivers may be using symbols shown in each row.

The next four columns 404 show the evolution of the Hadamard matrix generation of a 16-bit system. A sixth column 406 shows the symbols (e.g., a spreading code) used by a receiver to despread the signal. In sixth column 406, a box indicates which chips are used in the correlation of a signal for each receiver. For example, different rates may be provided by using different codes. A rate 1, rate 2, rate 4, and rate 8 are provided. The rates are different in that data for each correlator may be spread at different times based on the number of chips used. For example, the rate may be eight times faster for rate 8 than rate 1.

Figure 5:
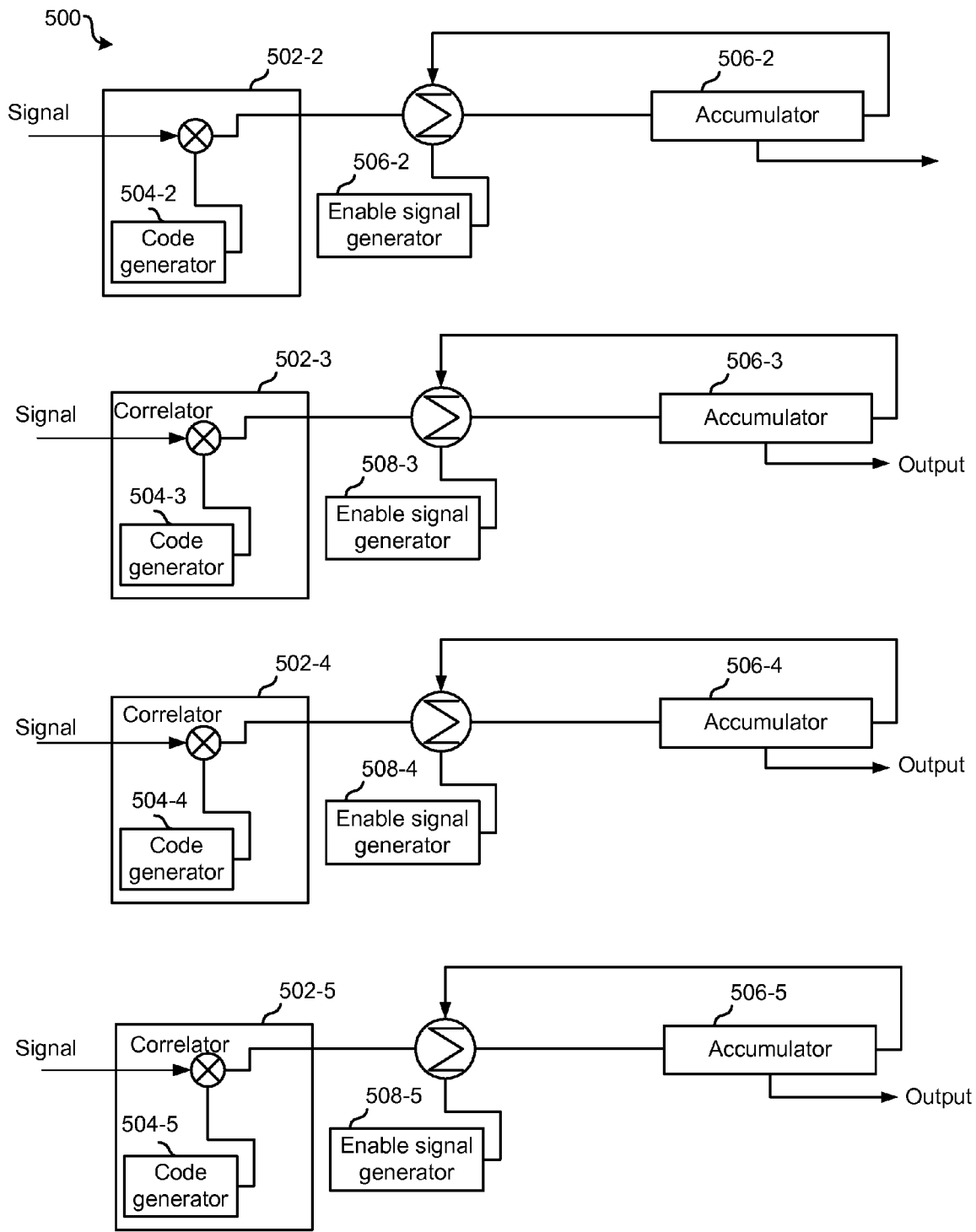
FIG. 5 shows an example of a receiver according to one embodiment.

FIG. 5 shows an example of a receiver 500 according to one embodiment. The receiver has multiple correlators 502. Correlators 502 are provided to despread a signal received by a code. For example, a symbol may be despread by multiplying it by a code used to spread the signal at the correct time. A code generator 504 generates a code, which are the chips that are used to despread the signal. Code generator 504 is correlated with a transmitter such that the transmit and receive sequences used are synchronized.

Each correlator 502 correlates a received signal using a symbol associated with it. For example, using the length of eight symbol set of FIG. 3 (column 606), each correlator 502 would correlate a signal using one of the symbols shown. For example, a correlator 502-2 O₈(2) uses the symbol [00110011] to correlate a received signal, correlator 502-3 O₈(3) uses the symbol [00111100], and so on.

Accumulators 506 are used to accumulate despread data for determining cell data that was transmitted on different channels. Correlator 502-2 may despread the signal using the symbol [00110011] but is programmed to only accumulate data in accumulator 506-2 when the second four chips [0011] are used to despread the signal. Correlator 502-3 uses the symbol [00111100] but is programmed to only include data that is despread in the accumulator 506-3 when the first four chips [0011] are applied to the signal.

In one example, the symbols shown in column 406 of FIG. 4 may be generated by code generator 504. If the signal is interleaved by 4, then enable signal generators 508 may apply the enable signal one out of four times during a code sequence. As shown in FIG. 4 in rows 4, 5, 6, and 7, the symbols 410 and 412 [00110011] and [0111100] were used to spread a signal. Information from for four different channels and/or cells is sent using the symbols 410 and 412. To spread the signal, code 408 may be interleaved and used to spread cells for four different channels. For example, code 408-1 may be used to spread information for a first cell 0, code 408-2 may be used to spread information for a second cell 1, and so on.

The received signal may be received at all correlators 502 and is multiplied by a code generated by code generator 504. The codes generated are from the symbol associated with a correlator 502. While correlator 502 may be despreading the received signal at all times, enable signal generator 508 is used to determine when information for an associated cell should be accumulated. For example, when the chips in code 408-1 are used to despread the signal, enable signal generator 508-2 asserts an enable signal, which causes an accumulation of the data in accumulator 506-2. Then, enable signal generator 508-4 asserts an enable signal for correlator 502-4 and despread data is accumulated in accumulator 506-4. Referring to FIG. 4, code 408-3 was used to spread the signal and thus contains data for correlator 502-4. Then, enable signal generator 508-3 asserts an enable signal. As shown in FIG. 4, code 408-2 was used to spread the signal and thus contains data for correlator 502-3. Enable signal generator 508-5 then generates an enable signal when code 408-4 is applied in correlator 502-5. Accordingly, information for the different cells that has been interleaved using the spreading code is accumulated in different accumulators 506. When the enable signal is not asserted for a correlator 502, the despread data is not accumulated. For example, when the enable signal is asserted for chip 408-3, the data despread for correlator 502-2, 502-3, and 502-5 is not accumulated in accumulators 506-2, 506-3, and 506-5.

In this example, each correlator 502 operates at a constant symbol rate. That is, the data signal received is despread at the same rate and data is output from accumulators 506 at a constant rate. For example, correlators 502 despread the signal by the symbol associated with it at the same rate. The enable signal is used to determine which data to accumulate in accumulator 602. Accordingly, differently configured receivers are not needed for each channel. Rather, logic as to when to assert the enable signal is configured for each correlator 502. This configuration may be much simpler than configured receivers to operate at different chip rates.

In the above example, five transmitters may be using the following codes and interleaves to send data.

TABLE I

| Code | Interleave |
|---|---|
| 1. 0000000000000000 | 1 |
| 2. 0000000011111111 | 1 |
| 3. 00001111 | 2 |
| 4. 0011 | 4 |
| 5. 01 | 8 |

Each transmitter 200 may transmit data at a different symbol rate. The interleave factor is used to determine when to assert the enable signal. As mentioned above, each correlator 502 operates at a constant symbol rate even when signals are sent using the five transmitters. The enable signal is just asserted at different times according to the interleave factor. For example, for a signal received from transmitter 5, an enable signal may be asserted eight different times in a 16 bit code sequence. For a signal received from transmitter 4, the enable signal is asserted four times in the 16 bit code sequence. However, correlators 502 despread signals from both transmitters at the same symbol rate. That is, the enable signal changes and allows different data to be stored in accumulator 506 depending on the interleave factor but the symbol rate used by correlators 502 remains constant.

The interleave factor may be sent in a cell that tells the receiver 500 when to assert an enable signal. A preamble of the cell may be used to indicate this information. Also, other methods may be used to send this information. For example, receivers 500 may know a priori the interleave factor used by each transmitter. Also, out of band signals may be used to send the information.

Figure 6:
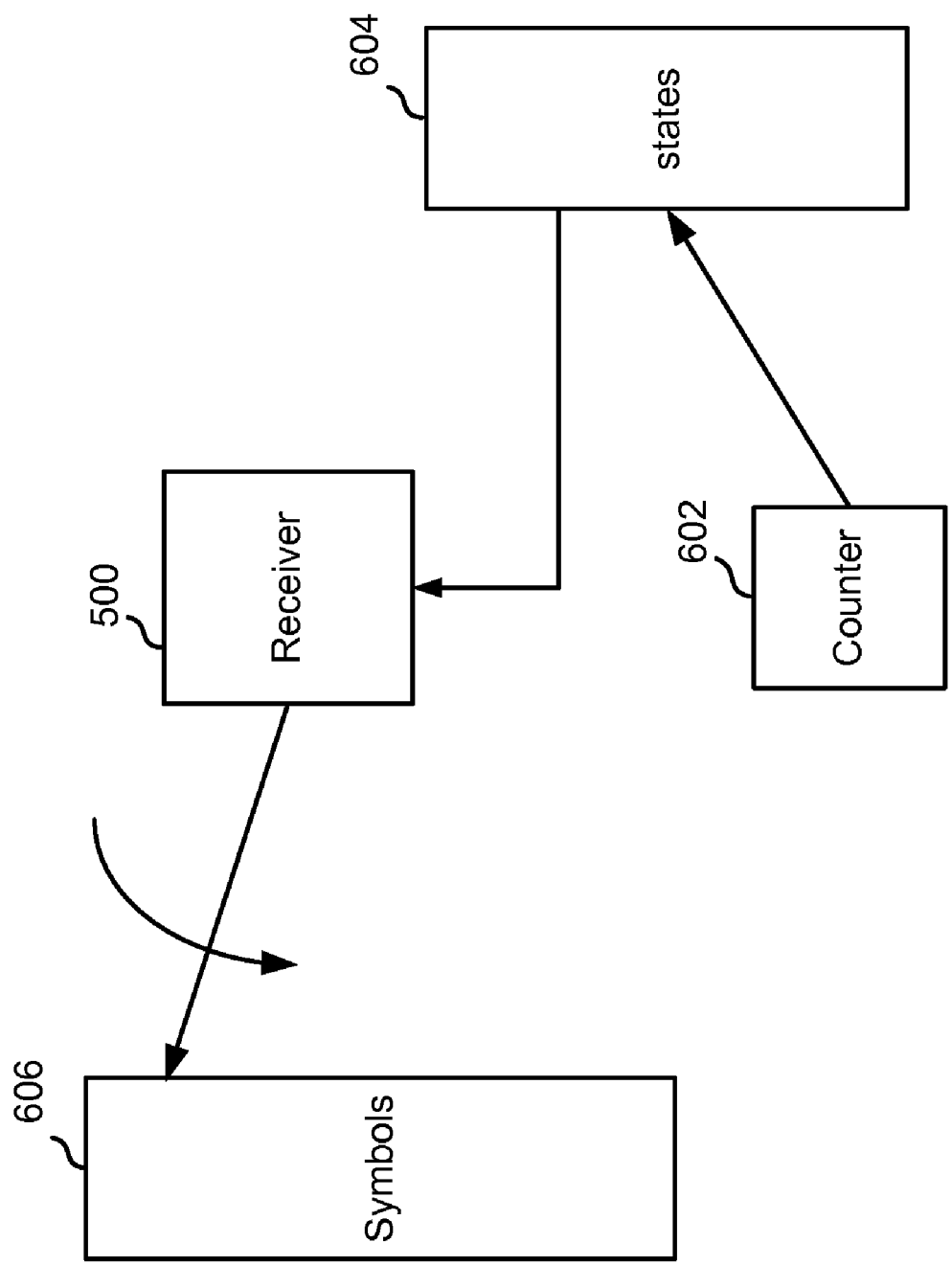
FIG. 6 shows an example of system to implement the receiver according to one embodiment.

FIG. 6 shows an example of system to implement receiver 500 according to one embodiment. Counter 602 is used to step through different states 604. States 604 may represent different states for correlators 502. A state may be an accumulate-enable signal as well as the end-of-symbol signal that passes the accumulated symbol on to the next stage (clock recovery, data detector) and also causes the accumulator to reset to zero in preparation to begin accumulating the next symbol's chips.

Symbols 606 may be the different symbols used in different channels (and correlators 502). As each enable signal is asserted, a different state 604 is used to determine which symbol 606 to use. For example, referring to FIG. 3 at state 0, a symbol shown at 412-1 may be used; at state 1, a symbol shown in 412-2 may be used; at state 2, the symbol shown at 412-3 may be used; and at state 4, the symbol shown in 412-4 may be used. Counter 602 may be used to increment the state used. Using the state, transmitter 500 may select a symbol 606 that is being used.

Although particular embodiments have been described with respect to specific embodiments thereof, these embodiments are merely illustrative, and not restrictive of the invention. For example, particular embodiments are not restricted to an orthogonal variable spreading factor (OVSF) code set. Any set with sufficient orthogonality in its subsequences may be used. Also, particular embodiments may be used with frequency hopping spreading schemes that correlate symbols using multiple temporally-separated frequency hops. Also, particular embodiments may be used with orthogonal frequency division multiplexing (OFDM) where symbols are correlated across multiple frequencies. Interleaving is accomplished by partitioning the frequency set.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory.

Particular embodiments can be implemented in the form of control logic in software or hardware or a combination of both. The control logic, when executed by one or more processors, may be operable to perform that which is described in particular embodiments.

A "processor" or "process" includes any human, hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

I claim:

1. A method for interleaving symbols in a wireless communication system, the method comprising:
receiving a data signal for a plurality of cells in a plurality of channels, the data signal being spread using a plurality of codes applied to a plurality of interleaved symbols for the plurality of cells;

despreading the data signal at a plurality of correlators at a constant symbol rate, each correlator using a code in the plurality of codes associated with it to despread the data signal;

enabling an accumulation of the despread data for the plurality of correlators at different times to determine data for the plurality of cells, wherein enabling the accumulation at different times is determined based on an interleave factor used to interleave symbols for cells in the received data signal; and determining the data for the plurality of cells at each correlator, each correlator corresponding to a channel and outputting data for a cell in the plurality of cells.

2. The method of claim 1, wherein each of the plurality of correlators is associated with a code in the plurality of codes used to despread the data signal.

3. The method of claim 1, wherein at least a portion of the plurality of correlators uses a same code to despread data for a cell associated with each correlator, the code being applied to the cell at different times.

4. The method of claim 3, wherein the code for each of the portion of the plurality of correlators are orthogonal to each other.

5. The method of claim 1, wherein enabling the accumulation comprises asserting an enable signal to enable accumulation of a portion of the data being despread at a correlator at different times.

6. The method of claim 5, further comprising receiving an interleave factor, the interleave factor being used to determine when to assert the enable feature.

7. The method of claim 1, wherein the code comprises a portion of a full-length code sequence.

8. The method of claim 1, wherein the plurality of codes are of a same value and each correlator uses the same code that is enabled at different times.

9. The method of claim 1, wherein the plurality of symbols are different but the codes used to spread the data are a portion of the symbols that are a same value.

10. The method of claim 1, further comprising:
determining the plurality of cells of data;
spreading the data for sending in the plurality of channels at the constant symbol rate, the data being spread using the plurality of codes applied to the plurality of interleaved symbols for the plurality of cells, wherein a code in the plurality of codes for a channel is used to spread the data at a different time; and
sending the data signal including the spread data to a receiver to allow the receiver to determine the data by despreading the data signal.

11. The method of claim 10, wherein determining the plurality of cells of data comprises receiving the data from one or more applications.

12. The method of claim 10, wherein data for each cell is sent on a different channel.

13. The method of claim 10, wherein the plurality of codes comprise codes that are of a same value and are used to spread the data at different times.

14. The method of claim 10, wherein the code used to spread the data at the different time comprises a portion of a full-length code sequence.

15. An apparatus configured to process interleaved symbols in a wireless communication system, the apparatus comprising:
one or more processors; and
logic encoded in one or more tangible media for execution by the one or more processors, and when executed being operable to:
receive a data signal for a plurality of cells in a plurality of channels, the data signal being spread using a plurality of codes applied to a plurality of interleaved symbols for the plurality of cells;
despread the data signal at a plurality of correlators at a constant symbol rate, each correlator using a code in the plurality of codes associated with it to despread the data signal;
enable an accumulation of the despread data for the plurality of correlators at different times to determine data for the plurality of cells, wherein the accumulation enabled at different times is determined based on an interleave factor used to interleave symbols for cells in the received data signal; and
determine the data for the plurality of cells at each correlator, each correlator corresponding to a channel and outputting data for a cell in the plurality of cells.

16. The apparatus of claim 15, wherein each of the plurality of correlators is associated with a code in the plurality of codes used to despread the data signal.

17. The apparatus of claim 15, wherein at least a portion of the plurality of correlators uses a same code to despread data for a cell associated with each correlator, the code being applied to the cell at different times.

18. The apparatus of claim 17, wherein the code for each of the portion of the plurality of correlators are orthogonal to each other.

19. The apparatus of claim 15, wherein logic operable to enable the accumulation comprises logic when executed that is further operable to assert an enable signal to enable accumulation of a portion of the data being despread at a correlator at different times.

20. The apparatus of claim 19, wherein the logic when executed is further operable to receive an interleave factor, the interleave factor being used to determine when to assert the enable feature.

21. The apparatus of claim 15, wherein the code comprises a portion of a full-length code sequence.

22. The apparatus of claim 15, wherein the plurality of codes are of a same value and each correlator uses the same code that is enabled at different times.

23. The apparatus of claim 15, wherein the plurality of symbols are different but the codes used to spread the data are a portion of the symbols that are a same value.

* * * * *